United States Patent [19]

Mellors

[11] 4,186,248
[45] Jan. 29, 1980

[54] SOLID STATE ELECTROLYTES

[75] Inventor: Geoffrey W. Mellors, North Royalton, Ohio

[73] Assignee: Union Carbide Corporation, New York, N.Y.

[21] Appl. No.: 973,552

[22] Filed: Dec. 27, 1978

[51] Int. Cl.² .............................................. H01M 6/18
[52] U.S. Cl. .................................................. 429/191
[58] Field of Search ........................................ 429/191

[56] References Cited

U.S. PATENT DOCUMENTS

| | | | |
|---|---|---|---|
| 2,718,539 | 9/1955 | Bradshaw | 429/191 |
| 3,657,016 | 4/1972 | Lilly et al. | 429/191 |
| 3,973,990 | 8/1976 | Borger et al. | 136/6 L |
| 4,118,549 | 10/1978 | Liang et al. | 429/191 |

FOREIGN PATENT DOCUMENTS 2330127  5/1977  France.

OTHER PUBLICATIONS

Schoonman, A Solid State Galvanic Cell with Fluoride-Conducting Electrolytes, J. Electro. Chem. Science and Techno., Dec. 1976, p. 1772.

*Primary Examiner*—Donald L. Walton
*Attorney, Agent, or Firm*—Cornelius F. O'Brien

[57] ABSTRACT

A solid state electrolyte comprising an ionically conducting product of a fused ternary mixture of lead fluoride, an alkali salt of sodium, potassium, rubidium or cesium in a range of 0.1 to 15.0 mole percent and a fluoride, nitrate or sulfate of magnesium, calcium, strontium or barium in a range of between 1 and 40 mole percent.

12 Claims, No Drawings

SOLID STATE ELECTROLYTES

FIELD OF THE INVENTION

The invention relates to a solid state electrolyte based on a fused ternary mixture containing lead fluoride.

BACKGROUND OF THE INVENTION

Ionic conductivity is usually associated with the flow of ions through an aqueous solution of metallic salts. In the vast majority of practical uses of ionic conductors, i.e., as electrolytes for dry cell batteries, the aqueous solution is immobilized in a paste or gelled matrix to overcome the difficulties associated with handling and packaging a liquid. However, even after immobilization, the system is still subject to possible leakage, has a limited shelf life due to drying out or crystallization of the salts and is suitable for use only within a limited temperature range corresponding to the liquid range of the electrolyte. In addition, the necessity of including a large volume of immobilizing material has hindered the aims of miniaturization.

In attempting to overcome the shortcomings of liquid systems, investigators have surveyed a large number of solid compounds hoping to find compounds which are solid at room temperature and have specific conductances approaching those exhibited by the commonly used liquid system. Most solids have specific conductances at room temperature (20° C.) in the range of $10^{-6}$ to $10^{-15}$ ohm$^{-1}$ cm.$^{-1}$ as compared to aqueous solutions of salts which nominally have a specific conductance of 0.5 to 0.8 ohm$^{-1}$ cm.$^{-1}$.

In addition to the shortcomings of liquid systems, improved microelectronic circuit designs have generally decreased the current requirements for electronic devices. This in turn has enhanced the applicability of solid electrolyte power sources which usually can only deliver currents in the microampere range. These solid electrolyte systems have the inherent advantages of being free of electrolyte leakage and internal gassing problems due to the absence of a liquid phase and corrosion phenomena. In addition, they also have a much longer shelf life than the conventional liquid power sources.

Solid electrolytes must be essentially electronic insulators so as not to internally short the cell while at the same time they must allow ionic movement in the crystal lattice for the cell to operate. It has been discovered that certain metallic salts which are solids at room temperatures have specific conductances sufficiently high to permit their use in practical battery applications. For example, U.S. Pat. No. 3,723,185 discloses solid state electrolytes of compounds conforming to the general formula AgI-MCN-AgCN or modifications thereof wherein M is potassium, rubidium, cesium of mixtures thereof.

Filed concurrently herewith by applicant and incorporated herein by reference in U. S. application Ser. No. 973,554 titled Solid State Electrolyte disclosing a relatively highly conducting solid state electrolyte made from a binary mixture of lead fluoride and a 0.1 to 15.0 mole percent of a selected alkali salt of sodium, potassium, rubidium and cesium.

It is an object of the present invention to provide a novel ionically conductive product that is solid at room temperature and has a high conductance to permit its use as a solid state electrolyte for battery applications.

Another object of the present invention is to provide a novel solid state electrolyte for battery applications that is essentially an electronic insulator so as not to internally short the cell in which it is to be used while at the same time it will allow ionic movement in the crystal lattice.

Another object of the present invention is to provide a novel solid state electrolyte of a fused ternary mixture containing lead fluoride as its major component and having a highly stable ionic conductivity at room temperature thus making it admirably suitable for battery applications.

It is another object of the present invention to provide a highly conducting solid electrolyte based on lead fluoride.

The foregoing and additional objects will become more fully apparent from the following description.

SUMMARY OF THE INVENTION

The invention relates to a solid state electrolyte comprising an ionically conductive product of a fused ternary mixture of lead fluoride ($PbF_2$), an alkali salt selected from the group of sodium (Na), potassium (K), rubidium (Rb) and cesium (Cs) salts in a range of between about 1.0 and about 15.0 mole percent and a fluoride, nitrate or sulfate of magnesium, calcium, strontium or barium in a range between about 1 and about 40 mole percent. Preferably the range of the former should be between about 1 and about .5 and the range of the latter should be between about 3 and about 10 mole percent based on the electrolyte.

Preferably the ionic conductivity of the solid state electrolyte of this invention should be at least $10^{-5}$ ohm$^{-1}$ centimeter$^{-1}$.

Suitable alkali salts would be potassium fluoride, rubidium fluoride, cesium fluoride, potassium carbonate, potassium sulfate and potassium nitrate. Suitable fluorides would be strontium fluoride, calcium fluoride, barium fluoride and magnesium fluoride. Suitable nitrates would be calcium nitrate and strontium nitrate. Suitable sulfates would be calcium sulfate, barium sulfate and strontium sulfate.

While both alpha-$PbF_2$ and beta-$PbF_2$ are anionic conductors, the beta-$PbF_2$ is more conductive but, nonetheless, neither is of the low resistivity that would be highly desirable in a solid electrolyte application. Beta-$PbF_2$ has a specific resistivity of about $5 \times 10^6$ ohm-cm, while that of alpha-$PbF_2$ is about $5 \times 10^7$ ohm-cm. If ordinary lead fluoride is heated for a short time above about 350° C. and then cooled, it is entirely converted to the beta form with a characteristic X-ray pattern. However, it has been observed that when this material is compressed to make a pellet for a conductivity measurement, it transforms partially to the alpha form. Although the resistivity of beta-$PbF_2$ is at levels marginally useful as a solid electrolyte in battery applications, the instability and reversion to the alpha form manifests itself in an increasing resistivity with increase of pressure such as would be employed in the fabrication of a solid electrolyte battery and with increase of temperature and age such as might be experienced during storage of a battery.

It has been discovered that, with the addition of the above-referred to alkali salts in a range between about 0.1 and about 15.0 mole percent and the above-referred to fluorides, nitrates and sulfates in the range of 1 to 40 mole percent to the lead fluoride, the product of the fused ternary mixture produced will have a high ionic conductivity thereby making it suitable for use in battery applications as a solid state electrolyte. It was also unexpectedly found that the addition of the above-referred to materials to lead fluoride had a very beneficial stabilizing effect on the ionic conductivity of the lead fluoride. As used herein, the term "stability" when referring to ionic conductivity shall mean the constancy of ionic conductivity with pressure, temperature and age. As stated above, stability of the ionic conductivity of a solid anionically conductive material is necessary if it is to be used as a solid state electrolyte in battery applications.

EXAMPLE I

Several lead fluoride-containing solid state electrolytes were prepared in the following manner. Lead fluoride along with the specific additions shown in Table I were separately vacuum dried at 140° C. for about an hour. The materials were then intimately mixed, placed in a platinum boat contained in a quartz vessel flushed with argon, and slowly heated up to as high as 850° C. to melt the materials. In the case of easily decomposable or volatile salts, slow heating was used to the minimum temperature necessary to melt the mixture. The melt was thereafter held at this temperature for 15 to 20 minutes to insure a homogeneous mixture. The solidified material was easily removed from the boat on cooling, transferred to a dry box and crushed in an agate mortar. The materials were thereafter formed into pellets measuring 1 sq. cm. cross section by 0.5 to 1.0 cm thick using a Carver Laboratory press operating at 45,000 psi. The resistivity of each pellet was measured and the results obtained are shown in Table I. As evident from the data shown in Table I, the resistivity of lead fluoride which is from $10^6$ to $10^7$ ohm-cm decreased with the addition of the materials shown to values as low as 642 ohm-cm.

TABLE I

| Mixture Composition (Molar) | Specific Resistivity (ohm-cm) at Room Temp. |
|---|---|
| $86PbF_2$-$10CaF_2$-$4KF$ | 1578 |
| $81PbF_2$-$15CaF_2$-$4KF$ | 2750 |
| $76PbF_2$-$20CaF_2$-$4KF$ | 2200 |
| $71PbF_2$-$25CaF_2$-$4KF$ | 2500 |
| $66PbF_2$-$35CaF_2$-$4KF$ | 1730 |
| $61PbF_2$-$35CaF_2$-$4KF$ | 1800 |
| $79PbF_2$-$6KF$-$15SrF_2$ | 10778 |
| $77PbF_2$-$8KF$-$15SrF_2$ | 1736 |
| $75PbF_2$-$10KF$-$15SrF_2$ | 3000 |
| $86PbF_2$-$10BaF_2$-$4KF$ | 1100 |
| $81PbF_2$-$15BaF_2$-$4KF$ | 2800 |
| $76PbF_2$-$20BaF_2$-$4KF$ | 4400 |
| $71PbF_2$-$25BaF_2$-$4KF$ | 14000 |
| $66PbF_2$-$30BaF_2$-$4KF$ | 113000 |
| $61PbF_2$-$35BaF_2$-$4KF$ | 132000 |
| $56PbF_2$-$40BaF_2$-$4KF$ | 483000 |
| $86PbF_2$-$10SrF_2$-$4RbF$ | 2660 |
| $86PbF_2$-$10SrF_2$-$4KF$ | 1477 |
| $81PbF_2$-$15SrF_2$-$4KF$ | 2413 |
| $76PbF_2$-$20SrF_2$-$4KF$ | 3544 |
| $71PbF_2$-$25SrF_2$-$4KF$ | 9310 |
| $66PbF_2$-$30SrF_2$-$4KF$ | 26000 |
| $61PbF_2$-$35SrF_2$-$4KF$ | 70000 |
| $56PbF_2$-$40SrF_2$-$4KF$ | 269000 |
| $88PbF_2$-$8SrF_2$-$4LiF$ | 380000 |
| $88PbF_2$$8SrF_2$-$4NaF$ | 20000 |
| $88PbF_2$$8SrF_2$-$4RbF$ | 5700 |
| $88PbF_2$-$8SrF_2$-$4CsF$ | 63000 |
| $88PbF_2$$8SrF_2$-$4RbCl$ | 4100 |
| $76PbF_2$-$20CaF_2$-$4RbF$ | 5200 |
| $76PbF_2$-$20BaF_2$-$4RbF$ | 6500 |
| $81PbF_2$-$15SrF_2$-$4KBr$ | 5200 |
| $81PbF_2$-$15SrF_2$-$4K_2CO_3$ | 7100 |

TABLE I-continued

| Mixture Composition (Molar) | Specific Resistivity (ohm-cm) at Room Temp. |
|---|---|
| $81PbF_2$-$15SrF_2$-$4K_2SO_4$ | 8500 |
| $76PbF_2$-$20SrF_2$-$4KBr$ | 7500 |
| $76PbF_2$-$20SrF_2$-$4K_2CO_3$ | 9800 |
| $76PbF_2$-$20SrF_2$-$4K_2SO_4$ | 18400 |
| $96PbF_2$-$2CaF_2$-$2KF$ | 1326 |
| $94PbF_2$-$3CaF_2$-$3KF$ | 827 |
| $95PbF_2$-$2CaF_2$-$3KF$ | 766 |
| $94PbF_2$-$2CaF_2$-$4KF$ | 642 |
| $95PbF_2$-$3CaF_2$-$2KF$ | 1134 |
| $94PbF_2$-$1CaF_2$-$5RbCl$ | 3450 |
| $96PbF_2$-$2MgF_2$-$2KF$ | 3630 |
| $94PbF_2$-$1MgF_2$-$5KF$ | 2430 |
| $94PbF_2$-$2MgF_2$-$4KF$ | 1108 |
| $96PbF_2$-$2MgF_2$-$2K_2CO_3$ | 4400 |
| $94PbF_2$-$1MgF_2$-$5K_2CO_3$ | 1047 |
| $94PbF_2$-$1MgF_2$-$4K_2CO_3$ | 1161 |
| $88PbF_2$-$8MgF_2$-$4KF$ | 26400 |
| $86PbF_2$-$10MgF_2$-$4KF$ | 21900 |
| $76PbF_2$-$20MgF_2$-$4KF$ | 40200 |
| $90PbF_2$-$5SrF_2$-$5KF$ | 848 |
| $88PbF_2$-$8SrF_2$-$2K_2CO_3$ | 1970 |
| $90PbF_2$-$8SrF_2$-$2K_2CO_3$ | 1202 |
| $86PbF_2$-$10CaF_2$-$2K_2CO_3$ | 1815 |
| $86PbF_2$-$10SrF_2$-$2K_2CO_3$ | 1405 |
| $96PbF_2$-$2Sr(NO_3)_2$-$2KNO_3$ | 1078 |
| $86PbF_2$-$10Sr(NO_3)_2$-$4KNO_3$ | 8290 |
| $86PbF_2$-$10SrF_2$-$4KNO_3$ | 1450 |
| *$88PbF_2$-$8SrF_2$-$4KF$ | 857 |
| $90PbF_2$-$6SrF_2$-$4KF$ | 1034 |
| $94.5PbF_2$-$0.5CaSO_4$-$5.0KF$ | 1136 |
| $94.5PbF_2$-$0.5CaSO_4$-$5.0K_2CO_3$ | 1164 |
| $88PbF_2$-$8SrF_2$-$4K_2SO_4$ | 5700 |
| $88PbF_2$-$8SrF_2$-$4KNO_3$ | 1900 |
| $88PbF_2$-$8SrF_2$-$4KCl$ | 20000 |
| $88PbF_2$-$8SrF_2$-$4KBr$ | 2500 |
| $88PbF_2$-$8SrF_2$-$4K_2CO_3$ | 1700 |
| $88PbF_2$-$8BaF_2$-$4KF$ | 1050 |
| $88PbF_2$-$8BaF_2$-$4K_2SO_4$ | 5900 |
| $88PbF_2$-$4CaF_2$-$4SrF_2$-$4KF$ | 4000 |
| $88PbF_2$-$4CaF_2$-$4SrF_2$-$4K_2SO_4$ | 15600 |

*The ionically conducting product formed from this ternary mixture was analyzed and found to contain the following: 78.63 wt./percent lead, 3.07 wt./percent strontium, 15.97 wt./percent fluorine and 0.60 wt./percent potassium.

EXAMPLE II

A lead disc anode, a solid electrolyte made from the molar mixture of $88PbF_2$-$8SrF_2$-$4KF$ and a cathode consisting of a 1:1 molar mixture of $MnF_3$ and $PbO_2$ which was further diluted with about 30 wt. % of the electrolyte was compressed together in a cavity of 1-cm² cross section at about 12,000 psi. The open circuit voltage of the cell so produced was 1.60 volts and when discharged across a 500-K-ohm resistor, the initial closed circuit voltage was 1.56 volts.

EXAMPLE III

A cell was prepared as in Example II with the exception that the cathode was a 1:1 molar mixture of $CoF_3$ and $PbO_2$. The open circuit voltage of the cell so produced was 1.9 volts and fell to 1.88 volts initially when a 100-K-ohm resistor was connected across the cell.

EXAMPLE IV

To further test the solid state electrolyte of this invention in a cell, a sheet-lead anode, a solid electrolyte made from the molar mixture $88PbF_2$-$8SrF_2$-$4KF$ and a lead dioxide ($PbO_2$) cathode were assembled together to form a cell. The open circuit voltage of the cell so produced was 1.192 volts and when discharged across a 500-K-Ohm resistor, the initial closed circuit voltage was 1.170 volts. Under this load condition, the initial current density was calculated to be 2.3μA/cm². Thus the solid state electrolyte of this invention is admirably suited for battery applications.

EXAMPLE V

A cell was constructed as described in Example IV with the exception that the cathode was electrolytic manganese dioxide mixed with the electrolyte made from the molar mixture 88PbF$_2$-8 SrF$_2$-4KF. The open circuit voltage of the cell so produced was 1.088 volts and when discharged across a 500-K-ohm resistor, the initial closed circuit voltage was 1.082 volts.

EXAMPLE VI

Several additional cells were prepared using an anode of lead, a solid electrolyte made from the molar mixture 88PbF$_2$-8SrF$_2$-4FK and a cathode as shown in Table II. The open circuit voltage of each cell produced was measured and is shown in Table II. From the data shown in Table II it is evident that the solid state electrolytes of this invention can be admirably suited for battery applications.

TABLE II

| Cathode Material | O.C.V. (Volts) | Cathode Material | O.C.V. (Volts) |
| --- | --- | --- | --- |
| HgF$_2$ + graphite | 1.20 | CF$_x$ | 0.50 |
| AgF$_2$ + graphite | 1.90 | EMD(MnO$_2$)/HgO | 1.05 |
| BiF$_3$ + graphite | 0.86 | CoF$_3$-MnO$_2$ | 1.23 |
| CoF$_3$ + graphite | 1.35 | BrF$_3$-PbO$_2$ | 1.11 |
| MnF$_3$ + graphite | 0.26 | MnF$_3$-PbO$_2$ | 1.71 |
| PbO$_2$ | 1.04 | CoF$_3$-PbO$_2$ | 1.90 |
| YF$_3$ + graphite | 0.95 | TaF$_5$-PbO$_2$ | 1.80 |
| AuF$_3$ + graphite | 1.24 | V$_2$O$_5$ | 0.85 |
| FeF$_2$ + graphite | 1.04 | FeS$_2$ | 0.53 |
| FeF$_3$ + graphite | 0.66 | WO$_3$ | 0.185 |
| EMD (MnO$_2$) | 1.09 | CoF$_3$-HIO$_3$ | 1.625 |
| MnF$_3$/MnO$_2$ | 1.30 | TaF$_5$ + graphite | 0.69 |
| CuF$_2$ + graphite | 0.80 | TaF$_5$-MnF$_3$ + graphite | 1.52 |

As evident from the examples above the solid state electrolyte of this invention can be used with various cell systems employing an anode such as lead or any metal more noble than lead and fluoride-containing solid cathodes.

What is claimed is:

1. A solid state cell electrolyte comprising an ionically conducting produce of a fused ternary mixture of lead fluoride, an alkali salt selected from the group consisting of sodium, potassium, rubidium and cesium salts in a range of between about 1.0 and about 15.0 mole percent and a fluoride, nitrate or sulfate of magnesium, calcium, strontium or barium in a range between about 1 and about 40 mole percent.

2. The solid state cell electrolyte of claim 1 wherein the alkali salt is selected from the group consisting of potassium fluoride, rubidium fluoride, cesium fluoride, potassium carbonate, potassium sulfate and potassium nitrate.

3. The solid state cell electrolyte of claim 1 wherein the fluoride is selected from the group consisting of strontium fluoride, calcium fluoride, barium fluoride and magnesium fluoride.

4. The solid state cell electrolyte of claim 1 wherein the nitrate is selected from the group consisting of calcium nitrate and strontium nitrate.

5. The solid state cell electrolyte of claim 1 wherein the sulfate is selected from the group consisting of calcium sulfate, barium sulfate and strontium sulfate.

6. The solid state electrolyte of claim 1 wherein the ionically conducting produce is formed from the fused ternary mixture 88PbF$_2$-8SrF$_2$-4KF.

7. The solid state electrolyte of claim 1 wherein the ionically conducting product is formed from the fused ternary mixture 94PbF$_2$-3CaF$_2$-3KF.

8. The solid state electrolyte of claim 1 wherein the ionically conducting product is formed from the fused ternary mixture 95PbF$_2$-2CaF$_2$-3KF.

9. The solid state electrolyte of claim 1 wherein the ionically conducting product is formed from the fused ternary mixture 94PbF$_2$-2CaF$_2$-4KF.

10. The solid state electrolyte of claim 1 wherein the ionically conducting product is formed from the fused ternary mixture 86PbF$_2$-10SrF$_2$-4KF.

11. The solid state electrolyte of claim 1 wherein the ionically conducting product is formed from the fused ternary mixture 86PbF$_2$-10BaF$_2$-4KF.

12. The solid state electrolyte of claim 1 wherein the ionically conducting product is formed from the fused ternary mixture 94PbF$_2$-2MgF$_2$-4KF.

* * * * *